(12) United States Patent
Yamashita et al.

(10) Patent No.: US 11,651,630 B2
(45) Date of Patent: May 16, 2023

(54) VEHICLE CONTROL DEVICE AND PASSENGER TRANSPORTATION SYSTEM

(71) Applicant: TOYOTA JIDOSHA KABUSHIKI KAISHA, Toyota (JP)

(72) Inventors: Keiji Yamashita, Nisshin (JP); Koichi Ikemoto, Nagoya (JP); Koji Taguchi, Sagamihara (JP); Shin Sakurada, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 16/578,771

(22) Filed: Sep. 23, 2019

(65) Prior Publication Data

US 2020/0160624 A1   May 21, 2020

(30) Foreign Application Priority Data

Nov. 20, 2018 (JP) .............................. JP2018-217643

(51) Int. Cl.
*G07C 5/08* (2006.01)
*G05D 1/00* (2006.01)
*G07C 5/02* (2006.01)

(52) U.S. Cl.
CPC ............. *G07C 5/08* (2013.01); *G05D 1/0088* (2013.01); *G07C 5/02* (2013.01); *G05D 2201/0212* (2013.01); *G05D 2201/0213* (2013.01)

(58) Field of Classification Search
CPC .... G07C 5/008; G07C 5/0841; G07C 5/0808; G07C 5/08; G07C 5/02; G08G 1/202; G05D 1/0088; G05D 1/0072; G05D 2201/0212; G05D 2201/0213; G05D 1/0248; G05D 1/0055; B60Q 9/00; H04W 4/44; B60W 30/0953; B60W 2520/10; B60W 2556/45; B60W 2556/50; B60W 50/029
USPC ......................................... 701/23, 29.2, 31.9
See application file for complete search history.

(56) References Cited

U.S. PATENT DOCUMENTS

| | | | |
|---|---|---|---|
| 10,481,605 B1* | 11/2019 | Maila | G05D 1/0214 |
| 2010/0283593 A1* | 11/2010 | Miller | B60C 23/0408 |
| | | | 340/447 |
| 2015/0178998 A1* | 6/2015 | Attard | G07C 5/008 |
| | | | 701/23 |
| 2015/0239436 A1 | 8/2015 | Kanai et al. | |
| 2017/0120804 A1* | 5/2017 | Kentley | B60W 30/08 |
| 2017/0247927 A1* | 8/2017 | Elie | G01R 31/3646 |
| 2018/0046182 A1* | 2/2018 | Joyce | G01C 21/3415 |
| 2018/0050704 A1* | 2/2018 | Tascione | B60W 10/04 |
| 2018/0052463 A1* | 2/2018 | Mays | B60W 60/007 |
| 2018/0224850 A1* | 8/2018 | Kroop | G08G 1/00 |

(Continued)

FOREIGN PATENT DOCUMENTS

| | | |
|---|---|---|
| JP | 2017-157067 A | 9/2017 |
| JP | 2017-182137 A | 10/2017 |
| WO | 2014/049856 A1 | 4/2014 |

*Primary Examiner* — Elaine Gort
*Assistant Examiner* — Ellis B. Ramirez
(74) *Attorney, Agent, or Firm* — Sughrue Mion, PLLC

(57) ABSTRACT

A vehicle control device includes a failure detection unit configured to detect a failure of a vehicle, and a vehicle controller configured to control the vehicle. The vehicle controller changes the control of the vehicle depending on a failure level when the failure detection unit detects a failure of an on-vehicle component other than the vehicle control device.

10 Claims, 8 Drawing Sheets

(56) References Cited

U.S. PATENT DOCUMENTS

| | | | |
|---|---|---|---|
| 2018/0259966 A1* | 9/2018 | Long | G05D 1/0246 |
| 2018/0281794 A1* | 10/2018 | Ravichandran | B60K 37/06 |
| 2019/0056234 A1* | 2/2019 | Lin | G01C 21/3461 |
| 2019/0103028 A1 | 4/2019 | Kobayashi et al. | |
| 2019/0155283 A1* | 5/2019 | Herbach | G06Q 50/30 |
| 2019/0270408 A1* | 9/2019 | Castro | B60Q 9/00 |
| 2020/0097010 A1* | 3/2020 | Maila | G05D 1/0214 |

\* cited by examiner

VEHICLE CONTROL DEVICE AND PASSENGER TRANSPORTATION SYSTEM

INCORPORATION BY REFERENCE

The disclosure of Japanese Patent Application No. 2018-217643 filed on Nov. 20, 2018 including the specification, drawings and abstract is incorporated herein by reference in its entirety.

BACKGROUND

1. Technical Field

The disclosure relates to a vehicle control device and a passenger transportation system.

2. Description of Related Art

In the related art, a vehicle configured to transport a passenger by autonomous traveling is known. Japanese Unexamined Patent Application Publication No. 2017-182137 (JP 2017-182137 A) discloses a demand bus traveling in response to a user's usage request.

SUMMARY

In a vehicle operated by a driver in the related art, when the vehicle fails, the driver can take appropriate measures for his own safety. On the other hand, no driver exists in the autonomous traveling vehicle such as a demand bus. Therefore, in such a vehicle, when the vehicle fails, the vehicle itself needs to take appropriate measures for the safety of the passenger.

For example, when the autonomous traveling vehicle fails, stopping the vehicle at a nearby stoppable position is conceivable. However, in this case, in order for the passengers to reach the destination, repair of the vehicle, transfer of the vehicle, manual operation of the vehicle by the passenger, or the like is needed. For this reason, if the above-described vehicle control is performed even when a failure that does not affect the traveling of the vehicle occurs, the convenience of the passengers is significantly reduced.

The disclosure suppresses the reduction of the passenger's convenience while the safety of the passengers is ensured, when the autonomous traveling vehicle fails.

The summary of the present disclosure is as follows.

(1) A first aspect of the disclosure relates to a vehicle control device that controls an autonomous traveling vehicle including a failure detection unit, and a vehicle controller. The failure detection unit is configured to detect a failure of the vehicle. The vehicle controller is configured to control the vehicle. The vehicle controller changes the control of the vehicle depending on a failure level when the failure detection unit detects a failure of an on-vehicle component other than the vehicle control device.

(2) The vehicle control device according to (1) may further include a failure notification unit configured to perform a notification of a failure of the vehicle. The failure notification unit may transmit failure information to a server outside the vehicle when the failure detection unit detects a failure of the on-vehicle component.

(3) The vehicle control device according to (1) or (2) may further include a failure notification unit configured to perform a notification of a failure of the vehicle. The failure notification unit may notify a passenger of the vehicle of failure information when the failure detection unit detects a failure of the on-vehicle component.

(4) In the vehicle control device according to any one of (1) to (3), the vehicle controller may issue a warning to an outside of the vehicle when the failure detection unit detects a failure of the on-vehicle component and the vehicle is immovable.

(5) In the vehicle control device according to any one of (1) to (4), the vehicle controller may cause the vehicle to stop at a stoppable position when the failure detection unit detects a failure of the on-vehicle component and the vehicle is movable, but is unreachable to a destination by autonomous traveling.

(6) In the vehicle control device according to any one of (1) to (5), the vehicle controller may cause the vehicle to move to a destination, and then cause the vehicle to move to a maintenance facility when the failure detection unit detects a failure of the on-vehicle component and the vehicle is reachable to the destination by autonomous traveling.

(7) In the vehicle control device according to any one of (1) to (6), the vehicle may include doors provided on both sides of the vehicle in a traveling direction. When the failure detection unit detects a failure in the door on one side of the vehicle, the vehicle controller may cause the vehicle to move to a destination, and then cause the vehicle to stop at a position at which a passenger is able to get off from the door on the other side of the vehicle.

(8) A second aspect of the disclosure relates to a passenger transportation system including a server, a vehicle, a failure detection unit, and a vehicle controller. The server is configured to create a traveling plan based on a vehicle allocation request from a user. The vehicle is configured to autonomously travel based on the traveling plan. The failure detection unit is configured to detect a failure of the vehicle. The vehicle controller is configured to control the vehicle. The vehicle controller changes the control of the vehicle depending on a failure level when the failure detection unit detects a failure of an on-vehicle component other than an electronic control unit provided in the vehicle.

With the vehicle control device and the passenger transportation system, it is possible to suppress the reduction of the passenger's convenience while the safety of the passengers is ensured, when the autonomous traveling vehicle fails.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
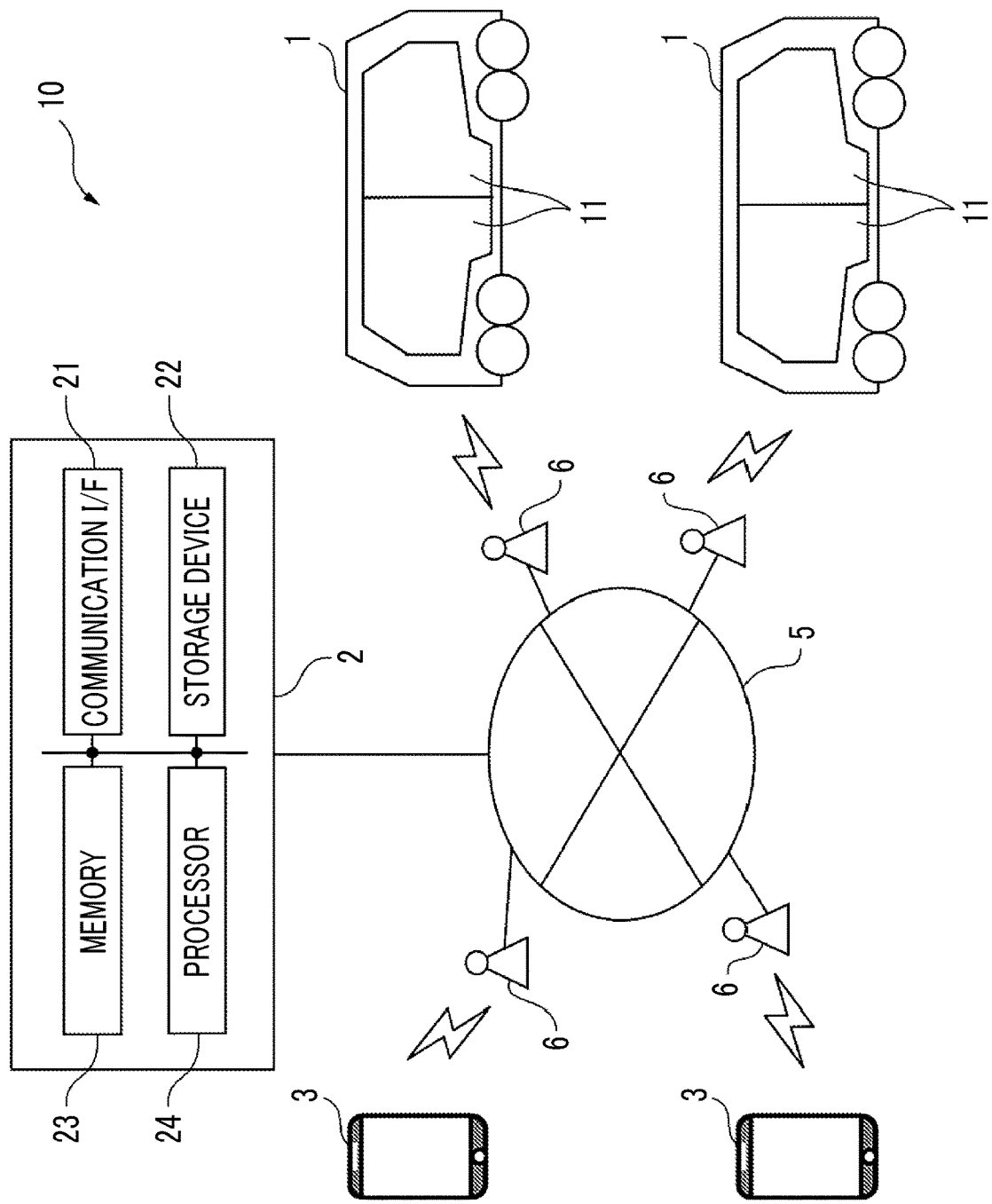
FIG. 1 is a schematic configuration diagram of a passenger transportation system according to a first embodiment of the present disclosure.

Hereinafter, embodiments of the present disclosure will be described with reference to the drawings. In the following description, similar components are denoted by the same reference numerals.

First Embodiment

Hereinafter, a first embodiment of the present disclosure will be described with reference to FIGS. 1 to 5. FIG. 1 is a schematic configuration diagram of a passenger transportation system according to the first embodiment of the present disclosure. The passenger transportation system 10 provides mobility service such as car sharing service or ride-hailing service. Specifically, the passenger transportation system 10 transports the user to a desired destination by using an autonomously traveling vehicle 1 in response to a vehicle allocation request from a user. In the ride-hailing service, a plurality of users aiming for destinations near each other can use one vehicle 1 at the same time.

As shown in FIG. 1, the passenger transportation system 10 includes the vehicle 1, a server 2 and a portable terminal 3. The vehicle 1, the server 2 and the portable terminal 3 can communicate with each other. The server 2 receives a vehicle allocation request from the user via the portable terminal 3 of the user, and creates a traveling plan based on the vehicle allocation request.

The vehicle 1 autonomously travels based on the traveling plan created by the server 2 and transports the user to the destination. That is, the vehicle 1 is an autonomous driving vehicle that autonomously travels, and does not need a driver for operating the vehicle 1. In the mobility service, a plurality of vehicles 1 is used so that a large number of users can use the service. The vehicle 1 is managed by a service provider who provides a mobility service.

Figure 2:
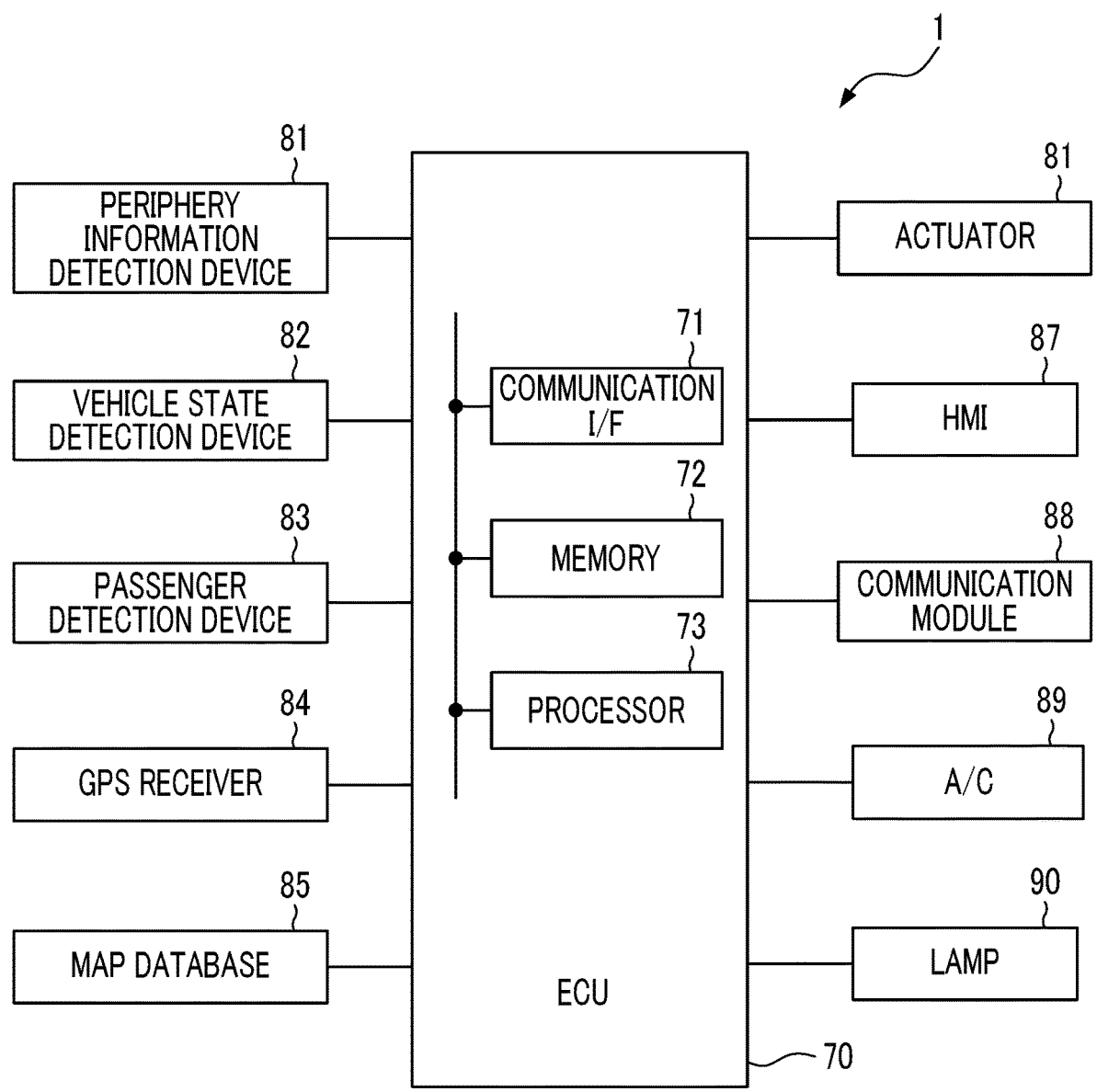
FIG. 2 is a schematic view showing a configuration of a vehicle.

FIG. 2 is a schematic view showing a configuration of a vehicle 1. The vehicle 1 includes an electronic control unit (ECU) 70. The ECU 70 includes a communication interface 71, a memory 72, and a processor 73, and executes various controls of the vehicle 1. The communication interface 71 and the memory 72 are connected to the processor 73 via a signal line. The ECU 70 is an example of a vehicle control device. Although one ECU 70 is provided in the vehicle in the first embodiment, a plurality of ECUs may be provided in the vehicle for each function.

The communication interface 71 has an interface circuit for connecting the ECU 70 to an in-vehicle network conforming to a standard such as a controller area network (CAN). The ECU 70 communicates with other on-vehicle components via the communication interface 71.

The memory 72 includes, for example, a volatile semiconductor memory (for example, a RAM) and a nonvolatile semiconductor memory (for example, a ROM). The memory 72 stores programs executed by the processor 73 and various data used when the processor 73 executes various processes.

The processor 73 includes one or a plurality of central processing units (CPU) and peripheral circuits of the CPUs, and executes various processes. The processor 73 may further include an arithmetic circuit such as a logical operation unit or a numerical operation unit.

In addition, the vehicle 1 includes a periphery information detection device 81. The periphery information detection device 81 detects periphery information of the vehicle 1 for autonomous traveling of the vehicle 1. The periphery information includes information such as white lines on a road, other vehicles, pedestrians, bicycles, buildings, road signs, traffic lights, and obstacles. The periphery information detection device 81 is connected to the ECU 70 via the in-vehicle network, and the output of the periphery information detection device 81 is transmitted to the ECU 70. The periphery information detection device 81 includes, for example, an external camera, a millimeter wave radar, a laser imaging detection and ranging (LIDAR), and an ultrasonic sensor. The external camera captures the outside of the vehicle 1 and generates a peripheral image.

In addition, the vehicle 1 includes a vehicle state detection device 82. The vehicle state detection device 82 detects a state of the vehicle 1 for autonomous traveling of the vehicle 1. The vehicle state detection device 82 is connected to the ECU 70 via the in-vehicle network, and the output of the vehicle state detection device 82 is transmitted to the ECU 70. The vehicle state detection device 82 includes, for example, a speed sensor, and a yaw rate sensor. The speed sensor detects the speed of the vehicle 1. The yaw rate sensor detects a yaw rate that is a rotational speed about a vertical axis passing through the center of gravity of the vehicle 1.

In addition, the vehicle 1 includes a passenger detection device 83. The passenger detection device 83 is used to detect the presence of a passenger in the vehicle 1 and to confirm the getting on and off of the passenger. The passenger detection device 83 is connected to the ECU 70 via the in-vehicle network, and the output of the passenger detection device 83 is transmitted to the ECU 70. The passenger detection device 83 includes, for example, an in-vehicle camera, a seatbelt sensor, a seating sensor, and an information reader. The in-vehicle camera captures the inside of the vehicle 1 and generates an in-vehicle image. The in-vehicle camera is disposed, for example, on a ceiling of the vehicle 1 so as to capture a passenger in the vehicle 1. As the in-vehicle camera, a plurality of cameras may be disposed at different positions in the vehicle.

The seatbelt sensor detects whether the passenger wears the seatbelt. The seating sensor detects whether the passenger is seated in the seat. The seatbelt sensor and the seating sensor are provided for each seat. The information reader reads identification information of the portable terminal 3, a QR code (registered trademark) or a password transmitted to the user as vehicle allocation information, card information of a utilization card for using the mobility service, and the like. The information reader is disposed near the door of the vehicle 1 or is provided for each seat.

The vehicle 1 also includes a GPS receiver 84. The GPS receiver 84 receives signals from three or more GPS satellites and detects a current position of the vehicle 1 (for example, the latitude and longitude of the vehicle 1). The GPS receiver 84 is connected to the ECU 70 via the in-vehicle network, and the output of the GPS receiver 84 is transmitted to the ECU 70.

In addition, the vehicle 1 includes a map database 85. The map database 85 stores map information. The map database 85 is connected to the ECU 70 via the in-vehicle network, and the ECU 70 acquires the map information from the map database 85. The map information stored in the map database 85 is updated using data received from the outside of the vehicle 1, or simultaneous localization and mapping (SLAM) technology.

In addition, the vehicle 1 includes an actuator 86. The actuator 86 operates the vehicle 1. The actuator 86 is connected to the ECU 70 via the in-vehicle network, and the ECU 70 controls the actuator 86. The actuator 86 includes, for example, a drive device (at least one of an engine and a motor) for accelerating the vehicle 1, a brake actuator for braking the vehicle 1, a steering motor for steering the vehicle 1, and a door actuator for opening and closing doors 11 of the vehicle 1.

In addition, the vehicle 1 includes a human machine interface (HMI) 87. The HMI 87 is an interface for inputting and outputting information between the passenger and the vehicle 1. The HMI 87 includes, for example, a display for displaying information, a speaker for generating sound, an operation button or touch screen for a passenger to perform an input operation, and a microphone for receiving a voice of the passenger. The HMI 87 provides information (a current position of the vehicle 1, weather, an ambient temperature, or the like) and entertainment (music, movies, TV programs, games, or the like) to the passenger of the vehicle 1. The HMI 87 is connected to the ECU 70 via the in-vehicle network, the output of the ECU 70 is transmitted to the passenger via the HMI 87, and input information from the passenger is input to the ECU 70 via the HMI 87.

In addition, the vehicle 1 includes a communication module 88. The communication module 88 is a device that enables communication between the vehicle 1 and the outside of the vehicle 1. The communication module 88 includes, for example, a data communication module (DCM) and a short-range wireless communication module (for example, a Wi-Fi module or a Bluetooth (registered trademark) module). The data communication module communicates with the server 2 via a wireless base station 6 and a communication network 5. The short-range wireless communication module directly communicates with the portable terminal 3.

The vehicle 1 also includes an air conditioner 89. The air conditioner 89 adjusts the temperature in a vehicle cabin based on the user's input to an input device (for example, the HMI 87). The air conditioner 89 is connected to the ECU 70 via the in-vehicle network, and the ECU 70 controls the operation of the air conditioner 89.

In addition, the vehicle 1 includes a lamp 90. The lamp 90 includes blinkers, brake lights, hazard lights, or the like. The lamp 90 is connected to the ECU 70 via the in-vehicle network, and the ECU 70 controls the turning-on of the lamp 90.

The server 2 is provided outside the vehicle 1 and manages the user and the vehicle 1 in order to efficiently provide the mobility service. Specifically, the server 2 performs registration of user information, matching between the user and the vehicle 1, creation of the traveling plan, settlement of the usage charge, and the like. The server 2 is managed by the service provider who provides the mobility service.

As shown in FIG. 1, the server 2 includes a communication interface 21, a storage device 22, a memory 23 and a processor 24. The communication interface 21, the storage device 22 and the memory 23 are connected to the processor 24 via signal lines. The server 2 may further include the input device such as a keyboard and a mouse, and an output device such as a display. Moreover, the server 2 may be configured by a plurality of computers.

The communication interface 21 has an interface circuit for connecting the server 2 to the communication network 5. The server 2 communicates with the vehicle 1 and the portable terminal 3 via the communication interface 21.

The storage device 22 includes, for example, a hard disk drive (HDD), a solid state drive (SSD), or an optical recording medium. The storage device 22 stores various data, and stores, for example, the user information, vehicle information, the map information, or a computer program for the processor 24 to execute various processes. The computer program may be recorded in the recording medium such as the optical recording medium or a magnetic recording medium, and distributed.

The memory 23 includes, for example, the semiconductor memory such as a random access memory (RAM). The memory 23 stores, for example, various data used when the processor 24 executes various processes.

The processor 24 has one or a plurality of CPUs and peripheral circuits of CPUs, and executes various processes. The processor 24 may further include an arithmetic circuit such as a logical operation unit or a numerical operation unit.

The portable terminal 3 is owned by the user and is movable with the user. The portable terminal 3 is a device that can communicate with the server 2 via the wireless base station 6 and the communication network 5. The portable terminal 3 includes the input device such as a touch panel and the microphone, and the output device such as a display and a speaker. The portable terminal 3 is, for example, a smartphone, a tablet terminal, a personal computer.

Figure 3:
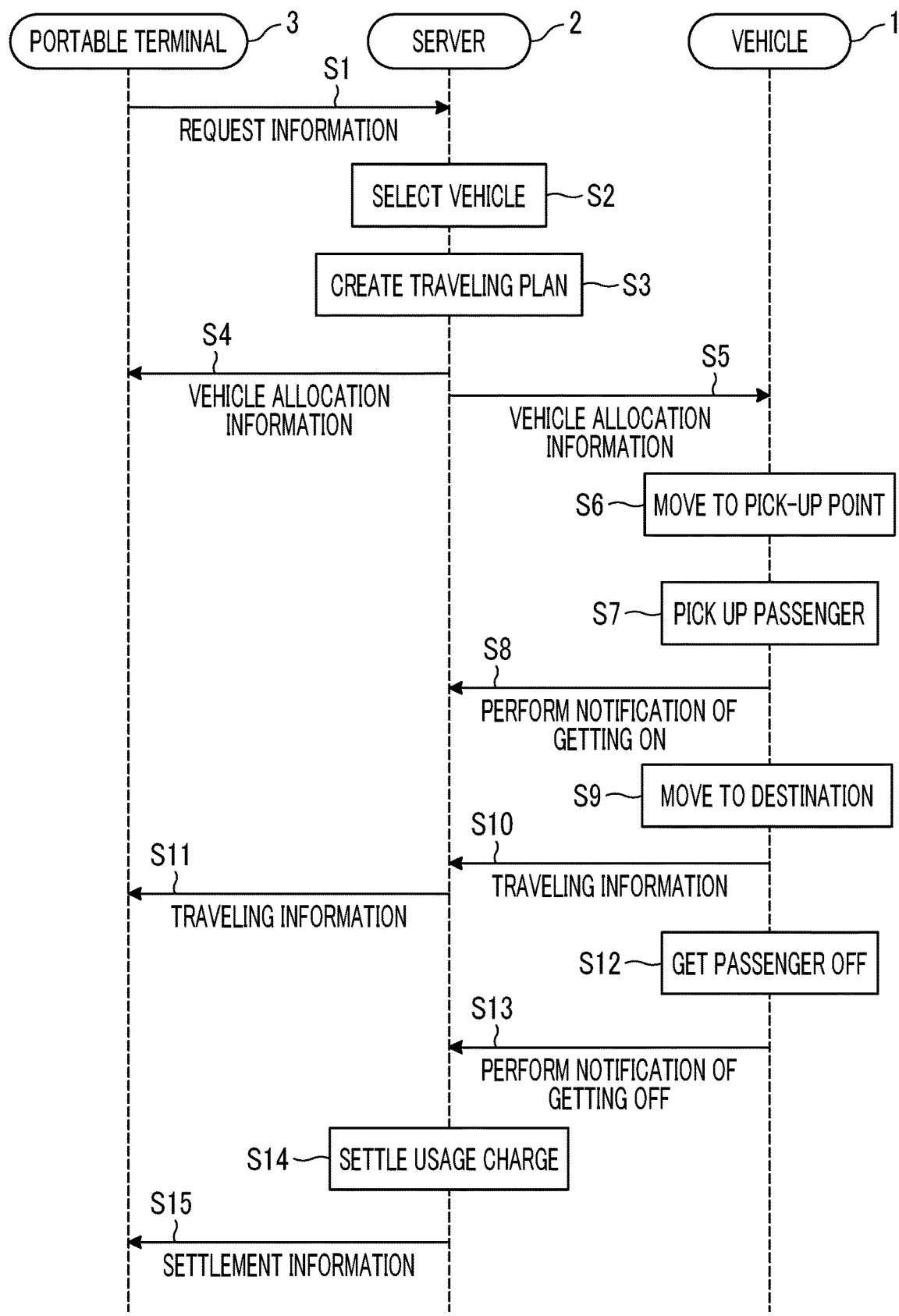
FIG. 3 is a sequence diagram showing an example of the operation of the passenger transportation system.

Hereinafter, the flow of the mobility service will be briefly described with reference to FIG. 3. FIG. 3 is a sequence diagram showing an example of the operation of the passenger transportation system 10. In the sequence diagram, communication between the server 2 and the portable terminal 3 and communication between the server 2 and the vehicle 1 are performed via the communication network 5.

A user who uses the mobility service registers the user information in advance using the portable terminal 3 or the like. The registered user information is stored in the storage device 22 of the server 2 for each user. When the user requests the use of the mobility service, that is, when the user makes the vehicle allocation request, the user operates the portable terminal 3 to input request information to the portable terminal 3. The user inputs the request information, for example, on an application for mobility service installed in the portable terminal 3.

When the request information is input to the portable terminal 3, the portable terminal 3 transmits the request information to the server 2 (step S1). The request information includes a pick-up point (for example, the current position of the user), a destination, identification information of the user (for example, a registration number of the user), fellow passenger information (for example, the number of passengers), and permission of vehicle sharing with others. The pick-up point refers to a desired getting-on position of the user.

When the server 2 receives the request information from the user via the portable terminal 3, the server 2 selects the vehicle 1 suitable for transportation of the user (step S2). That is, the server 2 performs matching between the user and the vehicle 1. The vehicle 1 suitable for transportation of the user is, for example, the waiting vehicle 1 closest to the pick-up point. In addition, when the user permits sharing with others, the vehicle 1 that another user currently uses may be selected.

Further, the server 2 creates a traveling plan for transportation of the user (step S3). The traveling plan includes estimated arrival time to the pick-up point, a travel route to the destination, estimated arrival time to the destination, an estimated getting-off position, and the like.

Next, the server 2 transmits the vehicle allocation information to the portable terminal 3 (step S4). The vehicle allocation information transmitted to the portable terminal 3 includes the estimated arrival time to the pick-up point, a travel route to the destination, the estimated arrival time to the destination, identification information of the vehicle 1 (the numbers of vehicle registration plate, a type of vehicle, or a color), and the presence or absence of others sharing the vehicle. Further, the server 2 transmits the vehicle allocation information to the vehicle 1 (step S5). The vehicle allocation information transmitted to the vehicle 1 includes the pick-up point, the destination, the travel route to the destination, the identification information of the user, and the like.

When the vehicle 1 receives the vehicle allocation information from the server 2, the vehicle 1 starts moving to the pick-up point (step S6). Thereafter, when the vehicle 1 reaches the pick-up point, the vehicle 1 picks up the passenger (a user or a user and a fellow passenger) (step S7).

The vehicle 1 notifies the server 2 that the passenger has got on after the passenger has got on the vehicle. Specifically, the vehicle 1 transmits a getting-on notification to the server 2 (step S8). After the passenger gets on the vehicle, the vehicle 1 starts moving to the destination (step S9).

The vehicle 1 transmits traveling information to the server 2 at predetermined intervals while the vehicle moves to the destination (step S10). The traveling information transmitted to the server 2 includes the current position of the vehicle 1, the periphery information of the vehicle 1, and the like. Further, the server 2 transmits the traveling information to the portable terminal 3 at predetermined intervals while the vehicle moves to the destination (step S11). The traveling information transmitted to the portable terminal 3 includes the current position of the vehicle 1, the estimated arrival time to the destination, congestion information of the travel route, and the like.

Thereafter, when the vehicle 1 reaches the destination, the passenger gets off the vehicle 1 (step S12). The vehicle 1 notifies the server 2 that the passenger has got off after the passenger has got off. Specifically, the vehicle 1 transmits a getting-off notification to the server 2 (step S13).

In addition, the server 2 settles the usage charge of the mobility service after the passenger gets off (step S14). For example, the server 2 settles the usage charge by account transfer or credit card settlement based on the user information stored in the storage device 22 of the server 2. The vehicle 1 transmits the settlement information including the contents of the settlement to the portable terminal 3 after the settlement of the usage charge is performed (step S15).

As described above, the vehicle 1 transports the passenger from the pick-up point to the destination by autonomous traveling. However, the vehicle 1 may fail while the service is being provided. In this case, since there is no driver in the vehicle 1, the vehicle 1 itself needs to take appropriate measures for the safety of the passengers.

For example, when the vehicle 1 fails, stopping the vehicle 1 at a nearby stoppable position is conceivable. However, in this case, in order for the passengers to reach the destination, repair of the vehicle 1, transfer of the vehicle 1, manual operation of the vehicle 1 by the passengers, or the like is needed. For this reason, when the above-described vehicle control is performed even when a failure that does not affect the traveling of the vehicle 1 occurs, the convenience of the passengers is significantly reduced. In the first embodiment, vehicle control at the time of failure is changed depending on a failure level.

Figure 4:
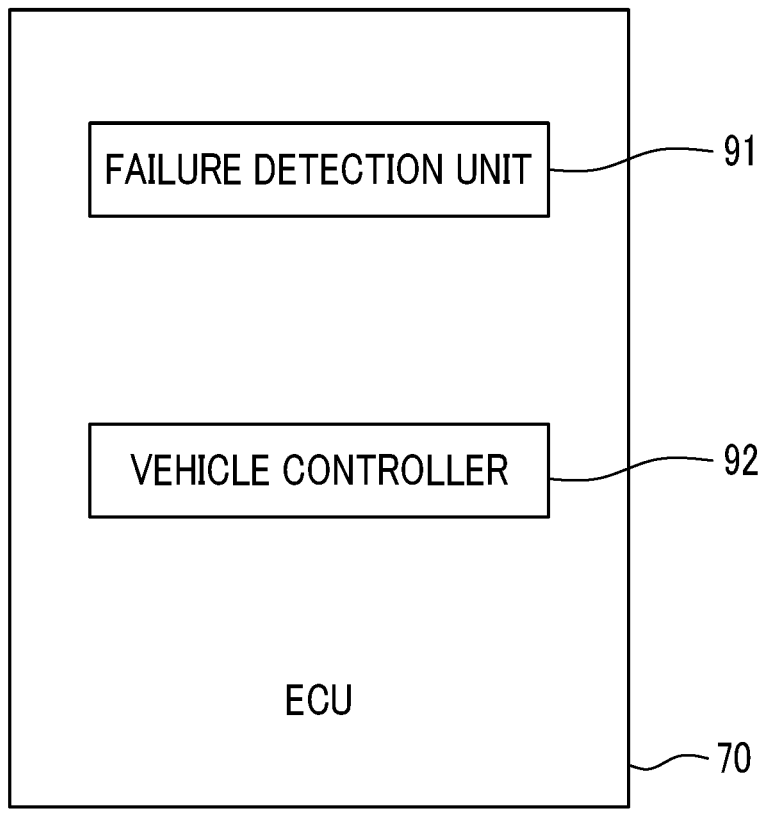
FIG. 4 is a functional block diagram of an electronic control unit (ECU) of the vehicle in the first embodiment.

FIG. 4 is a functional block diagram of the ECU 70 of the vehicle 1 in the first embodiment. In the first embodiment, the ECU 70 has a failure detection unit 91 and a vehicle controller 92. The failure detection unit 91 and the vehicle controller 92 are functional blocks realized by the processor 73 of the ECU 70 executing the programs stored in the memory 72 of the ECU 70.

The failure detection unit 91 detects a failure of the vehicle 1. The failure detection unit 91 detects a failure of each on-vehicle component of the vehicle 1 by, for example, a known on-board diagnostics (OBD) mounted on the vehicle 1.

The vehicle controller 92 controls the vehicle 1. In the first embodiment, when the failure detection unit 91 detects a failure of the on-vehicle component other than the control device of the vehicle 1 (the ECU 70 in the first embodiment) (hereinafter, simply referred to as an "on-vehicle component"), the vehicle controller 92 changes the control of the vehicle 1 depending on the failure level. Thus, since the vehicle 1 takes the measures depending on the failure level when the on-vehicle component fails, the reduction of the passenger's convenience is suppressed while the safety of the passengers is ensured. Examples of the on-vehicle component other than the control device of the vehicle 1 include, for example, a periphery information detection device 81, a vehicle state detection device 82, a passenger detection device 83, a GPS receiver 84, a map database 85, an actuator 86, an HMI 87, a communication module 88, an air conditioner 89, and lamp 90.

Specifically, the vehicle controller 92 issues a warning to the outside of the vehicle 1 when the failure detection unit 91 detects the failure of the on-vehicle component and the vehicle 1 is immovable. Accordingly, the vehicle can notify surroundings of the abnormality of the vehicle 1 and the safety of the passengers of the vehicle 1 at the time of failure can be improved.

When the failure detection unit 91 detects a failure of the on-vehicle component and the vehicle 1 is movable, but is unreachable to the destination by autonomous traveling, the vehicle controller 92 causes the vehicle 1 to stop at a stoppable position. Accordingly, the safety of the passengers of the vehicle 1 at the time of failure can be ensured. In addition, since the passenger can safely get off the failed vehicle 1, the convenience of the passenger can be enhanced.

When the failure detection unit 91 detects a failure of the on-vehicle component and the vehicle 1 is reachable to the destination by autonomous traveling, the vehicle controller 92 causes the vehicle 1 to move to the destination, and then causes the vehicle 1 to move to a maintenance facility. Accordingly, even when the vehicle 1 fails, the passenger can safely reach the destination, and the convenience of the passenger can be enhanced. Also, by repairing the vehicle 1 at the maintenance facility after the passenger is transported, the vehicle 1 can be used again to provide mobility services.

Failure Handling Control

Figure 5:
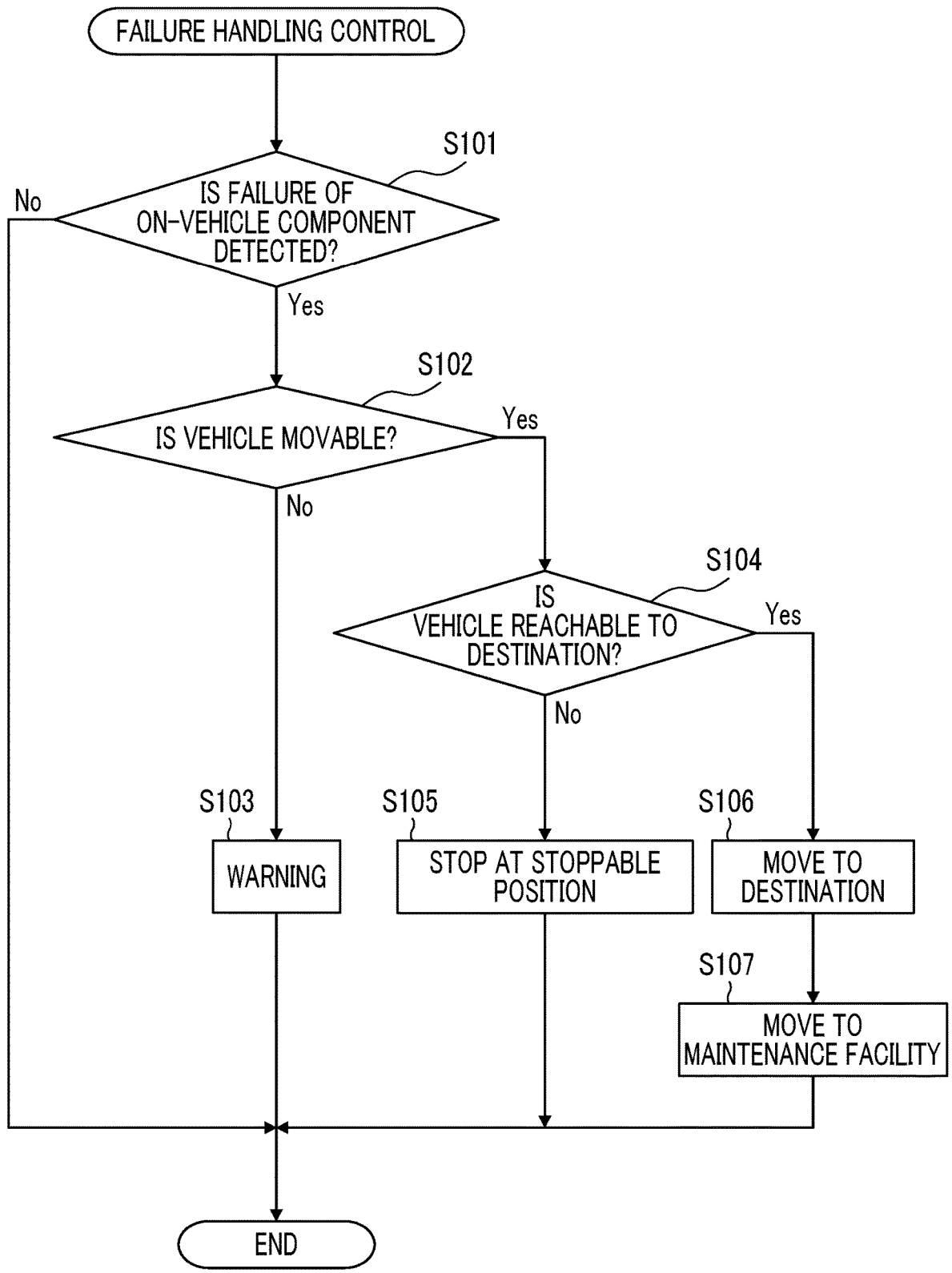
FIG. 5 is a flowchart showing a control routine of failure handling control in the first embodiment.

Hereinafter, control at the time of a failure of the vehicle 1 will be described in detail with reference to FIG. 5. FIG. 5 is a flowchart showing a control routine of failure handling control in the first embodiment. The control routine is repeatedly executed by the ECU 70.

First, in step S101, the vehicle controller 92 determines whether the failure detection unit 91 detects a failure of the on-vehicle component. When the vehicle controller 92 determines that a failure of the on-vehicle component is not detected, the control routine ends. Meanwhile, when the vehicle controller 92 determines that a failure of the on-vehicle component is detected, the control routine proceeds to step S102.

In step S102, the vehicle controller 92 determines whether the vehicle 1 is movable. For example, the vehicle controller 92 determines that the vehicle 1 is immovable when the vehicle 1 cannot move due to a failure of the drive device and determines that the vehicle 1 is movable when the drive device can cause the vehicle 1 to move. The presence or absence of movement of the vehicle 1 is detected using the periphery information detection device 81, the speed sensor, the GPS receiver 84, and the like. When the vehicle controller 92 determines that the vehicle 1 is immovable in step S102, the control routine proceeds to step S103.

In step S103, the vehicle controller 92 issues a warning to the outside of the vehicle 1. For example, the vehicle controller 92 turns on the hazard lights of the lamp 90. The vehicle controller 92 may issue a warning to the outside of the vehicle 1 by sound, display, light, or a combination thereof via the output device (for example, HMI 87) provided outside the vehicle 1 together with turning-on of the hazard lights.

After step S103, the control routine ends.

On the other hand, when the vehicle controller 92 determines that the vehicle 1 is movable in step S102, the control routine proceeds to step S104. In step S104, the vehicle controller 92 determines whether the vehicle 1 is reachable to the destination by autonomous traveling. The destination designated by the passenger is transmitted to the vehicle 1 in advance as the vehicle allocation information.

For example, when a failure of the periphery information detection device 81, the vehicle state detection device 82, the GPS receiver 84, the map database 85, the drive device, the brake actuator, the steering motor, or the lamp 90 is detected, the vehicle controller 92 determines that the vehicle 1 is unreachable to the destination by autonomous traveling. On the other hand, when a failure of the passenger detection device 83, the door actuator, the HMI 87, the communication module 88, or the air conditioner 89 is detected, the vehicle controller 92 determines that the vehicle 1 is reachable to the destination by autonomous traveling.

When the vehicle controller 92 determines in step S104 that the vehicle 1 is unreachable to the destination by autonomous traveling, that is, determines that the vehicle 1 cannot autonomously travel, the control routine proceeds step S105. In step S105, the vehicle controller 92 causes the vehicle 1 to stop at the stoppable position (for example, a road shoulder near the current position of the vehicle 1) by the actuator 86. At this time, the vehicle controller 92 may issue a warning to the outside of the vehicle 1 as in step S103. After step S105, the control routine ends.

On the other hand, when the vehicle controller 92 determines that the vehicle 1 is reachable to the destination by autonomous traveling in step S104, that is, the vehicle 1 is able to autonomously travel, the control routine proceeds to step S106. In step S106, the vehicle controller 92 causes the vehicle 1 to move to the destination by the actuator 86.

Next, after the passenger gets off, in step S107, the vehicle controller 92 causes the vehicle 1 to move to the maintenance facility by the actuator 86. The position of the maintenance facility is registered in advance in the map database 85. When a plurality of maintenance facilities is registered, the vehicle controller 92 causes the vehicle 1 to move to the closest maintenance facility from the destination. When a plurality of passengers with different destinations uses the vehicle 1, the vehicle controller 92 causes the vehicle 1 to the maintenance facility after the vehicle 1 moves to the final destination, that is, after all the passengers get off. After step S107, the control routine ends.

Second Embodiment

Configurations and controls of the passenger transportation system and the vehicle control device according to the second embodiment are basically the same as those of the first embodiment except for the points described below. Therefore, in the following, the second embodiment of the present disclosure will be described focusing on differences from the first embodiment.

Figure 6:
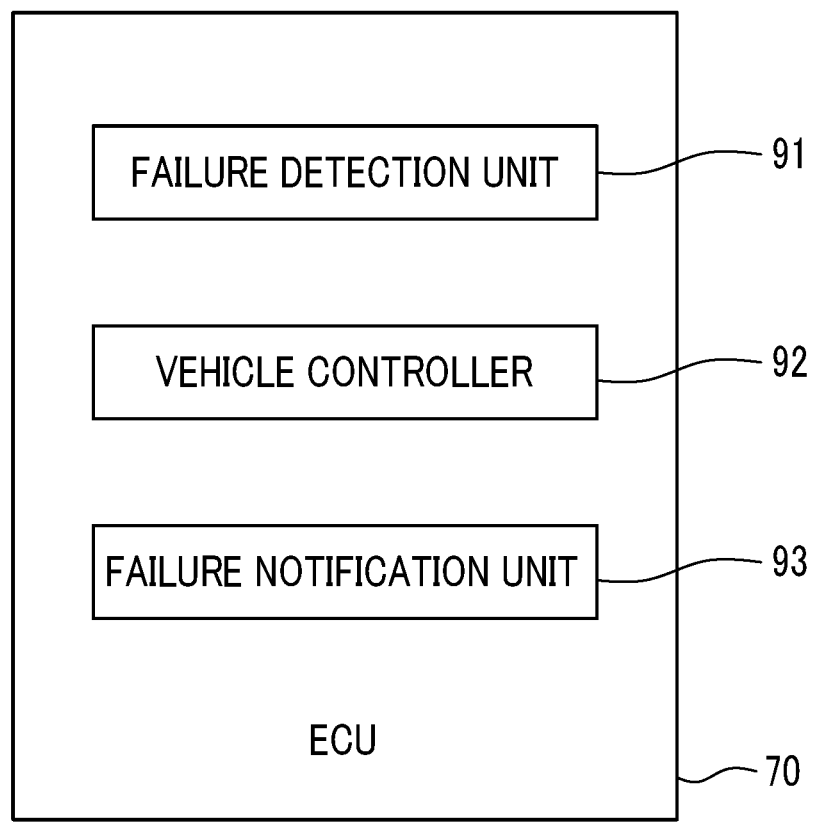
FIG. 6 is a functional block diagram of an ECU of a vehicle according to a second embodiment.

FIG. 6 is a functional block diagram of an ECU 70 of a vehicle 1 according to a second embodiment. In the second embodiment, the ECU 70 includes a failure notification unit 93 in addition to the failure detection unit 91 and the vehicle controller 92. The failure detection unit 91, the vehicle controller 92, and the failure notification unit 93 are functional blocks realized by the processor 73 of the ECU 70 executing the programs stored in the memory 72 of the ECU 70. The failure notification unit 93 notifies the failure of the vehicle 1.

When the vehicle 1 can autonomously travel when the on-vehicle component fails, the vehicle 1 can reach the maintenance facility by itself. On the other hand, when the vehicle 1 cannot autonomously travel when the on-vehicle component fails, movement or repair of the vehicle 1 is needed to be artificially performed.

In the second embodiment, when the failure detection unit 91 detects a failure of the on-vehicle component, the failure notification unit 93 transmits failure information to the server 2. Accordingly, the service provider can appropriately take measures to the failure of the vehicle 1 based on the failure information transmitted to the server 2 without troubling the passenger of the vehicle 1. As a result, the convenience of the passenger can be improved.

Moreover, the passenger of the vehicle 1 is hard to accurately grasp a failure of the vehicle 1. For this reason, when the vehicle 1 behaves differently from normal due to a failure of the vehicle 1, the passenger of the vehicle 1 feel uneasy about the safety of the vehicle 1. Therefore, in the second embodiment, the failure notification unit 93 notifies the passenger of the vehicle 1 of the failure information when the failure detection unit 91 detects a failure of the on-vehicle component. Accordingly, the anxiety of the passenger at the time of failure of the vehicle 1 can be reduced.

Failure Handling Control

Figure 7:
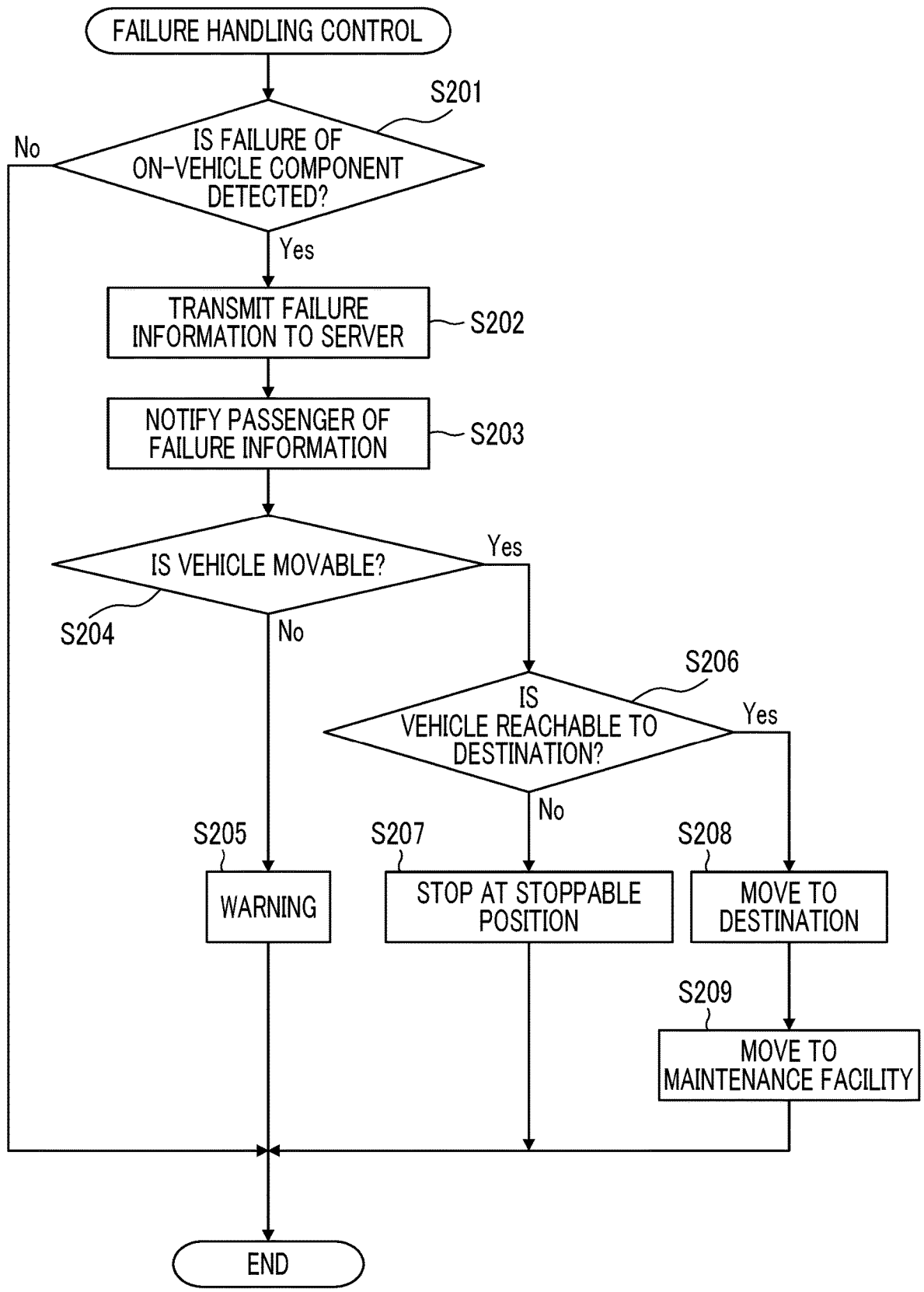
FIG. 7 is a flowchart showing a control routine of failure handling control in the second embodiment.

FIG. 7 is a flowchart showing a control routine of failure handling control in the second embodiment. The control routine is repeatedly executed by the ECU 70.

First, in step S201, the failure notification unit 93 determines whether the failure detection unit 91 detects a failure of the on-vehicle component. When the vehicle controller 92 determines that a failure of the on-vehicle component is not detected, the control routine ends. On the other hand, when the vehicle controller 92 determines that a failure of the on-vehicle component is detected, the control routine proceeds to step S202.

In step S202, the failure notification unit 93 transmits failure information to the server 2 via the communication network 5. The failure information includes the identification information of the vehicle 1 (such as the registration number of the vehicle 1), and a failure code indicating a failure location and the content of the failure.

Next, in step S203, the failure notification unit 93 notifies the passenger of the vehicle 1 of the failure information via the HMI 87 or the portable terminal 3. The failure information includes the failure location, the content of the failure, and the like. After step S203, the control routine proceeds to step S204. The description of steps S204 to S209 is omitted because steps S204 to S209 are the same as steps S102 to S107 in FIG. 5. In the control routine, step S202 or step S203 may be omitted.

Third Embodiment

Configurations and controls of the passenger transportation system and the vehicle control device according to the third embodiment are basically the same as those of the first embodiment except for the points described below. Therefore, in the following, the third embodiment of the present disclosure will be described focusing on differences from the first embodiment.

In the third embodiment, the vehicle 1 includes doors provided on both sides of the vehicle 1 in a traveling direction. Incidentally, FIG. 1 shows only the doors 11 on one side of the vehicle 1.

When the doors are provided on both sides of the vehicle 1, even if the door on one side of the vehicle fails, the passenger is able to get off the vehicle from the door on the other side. Therefore, in the third embodiment, when the failure detection unit 91 detects a failure of the door on one side of the vehicle 1, the vehicle controller 92 causes the vehicle 1 to move to the destination and then causes the vehicle 1 to stop at a position at which a passenger is able to get off from the door on the other side of the vehicle 1. Accordingly, even when the door on one side of the vehicle fails, the vehicle can complete the transportation of the passenger without forcing the passenger to take special action. As a result, the convenience of the passenger can be improved.

Getting-Off Process

Figure 8:
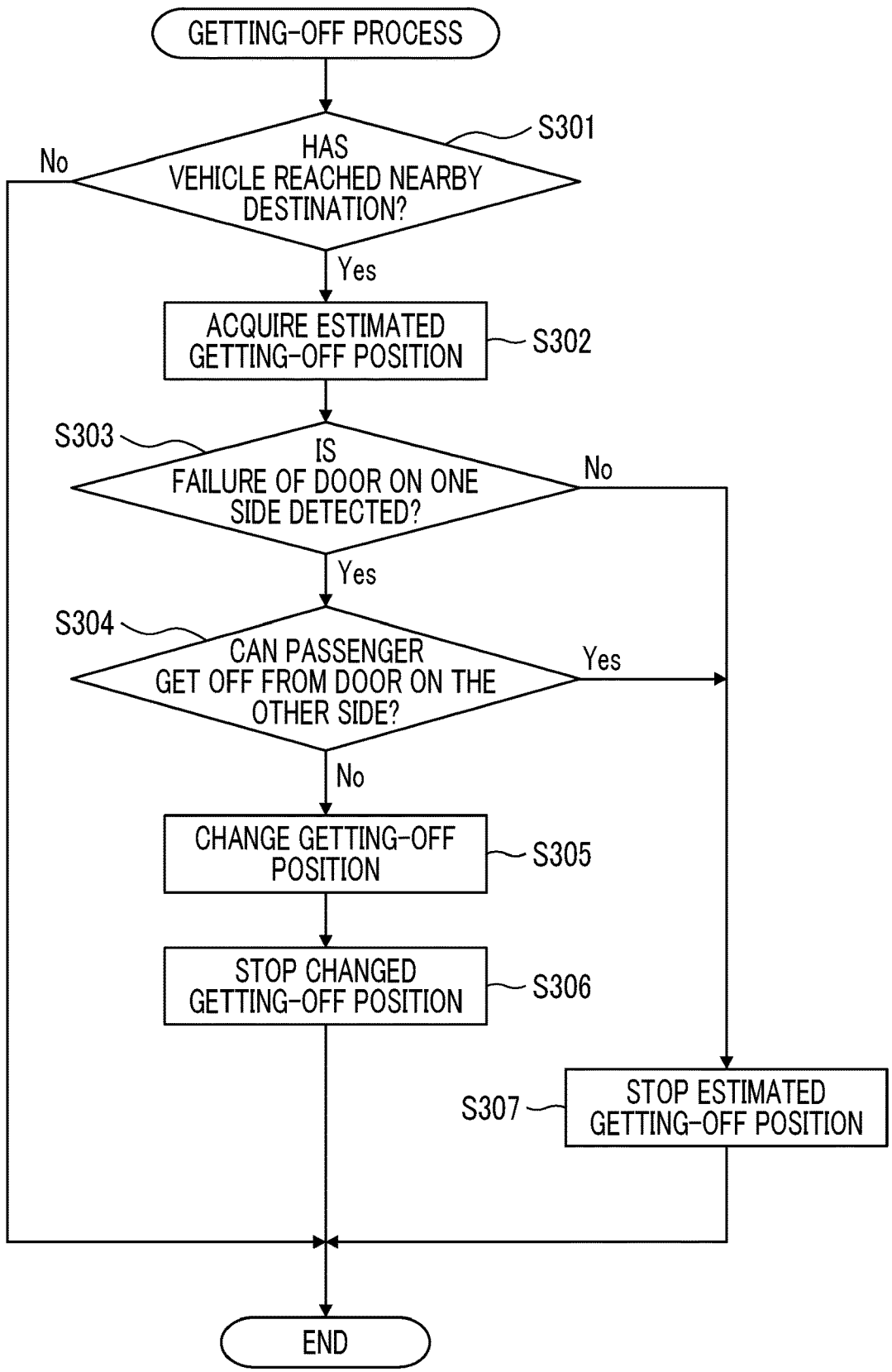
FIG. 8 is a flowchart showing a control routine of a getting-off process in a third embodiment.

FIG. 8 is a flowchart showing a control routine of a getting-off process in a third embodiment. The control routine is repeatedly executed by the ECU 70.

First, in step S301, the vehicle controller 92 determines whether the vehicle 1 reaches the vicinity of the destination. For example, the vehicle controller 92 determines that the vehicle 1 reaches the vicinity of the destination, when a distance between the vehicle 1 and the destination is equal to or less than a predetermined distance. The distance between the vehicle 1 and the destination is a distance in a straight line or a distance of the travel route. The distance between the vehicle 1 and the destination is calculated based on, for example, a position of the destination that is included in the vehicle allocation information transmitted to the vehicle 1, the current position of the vehicle 1 detected by the GPS receiver 84, and the map information in the map database 85.

The vehicle controller 92 may determine that the vehicle 1 reaches the vicinity of the destination when the time needed for the vehicle 1 to reach the destination is equal to or less than a predetermined time. In this case, the time needed to reach the destination is calculated based on, for example, the position of the destination that is included in the vehicle allocation information transmitted to the vehicle 1, the current position of the vehicle 1 detected by the GPS receiver 84, the map information in the map database 85, and a speed of the vehicle detected by the vehicle state detection device 82.

In step S301, when the vehicle controller 92 determines that the vehicle 1 does not reach the vicinity of the destination, the control routine ends. In step S301, when the vehicle controller 92 determines that the vehicle 1 reaches the vicinity of the destination, the control routine proceeds to step S302.

In step S302, the vehicle controller 92 acquires the estimated getting-off position. The estimated getting-off position is determined in the traveling plan and is included in the vehicle allocation information transmitted to the vehicle 1. The estimated getting-off position may be designated by the passenger via the HMI 87 or the portable terminal 3 while the vehicle 1 is traveling.

Next, in step S303, the vehicle controller 92 determines whether the failure detection unit 91 detects a failure of the door on one side of the vehicle 1. On the other hand, when the vehicle controller 92 determines that a failure of the door on one side of the vehicle is detected, the control routine proceeds to step S304.

In step S304, the vehicle controller 92 determines whether the passenger is able to get off from the door on the other side of the vehicle, that is, from a non-failed door at the estimated getting-off position. The vehicle controller 92 determines that when the door on the other side is positioned on a sidewalk side when the vehicle 1 stops at the estimated getting-off position, the passenger is able to get off from the door on the other side of the vehicle. In other words, the vehicle controller 92 determines that when the door on one side is positioned on a roadside when the vehicle 1 stops at the estimated getting-off position, the passenger is able to get off from the door on the other side of the vehicle. On the other hand, the vehicle controller 92 determines that when the door on the other side is positioned on the roadside when the vehicle 1 stops at the estimated getting-off position, the passenger is not able to get off from the door on the other side of the vehicle. In other words, the vehicle controller 92 determines that when the door on one side is positioned on the sidewalk side when the vehicle 1 stops at the estimated getting-off position, the passenger is not able to get off from the door on the other side of the vehicle.

In step S304, the vehicle controller 92 determines that the passenger is not able to get off from the door on the other side of the vehicle, the control routine proceeds to step S305. In step S305, the vehicle controller 92 changes the getting-off position such that the passenger can get off from the door on the other side. Specifically, the vehicle controller 92 changes the getting-off position such that the door on the other side is positioned on the sidewalk side. In other words, the vehicle controller 92 changes the getting-off position such that the door on one side is positioned on the roadside.

Next, in step S306, the vehicle controller 92 causes the vehicle 1 to stop at the changed getting-off position by the actuator 86. After step S306, the control routine ends.

On the other hand, when the vehicle controller 92 determines that a failure of the doors on both sides of the vehicle is not detected in step S303, the control routine proceeds to step S307. In step S307, the vehicle controller 92 causes the vehicle 1 to stop at the estimated getting-off position by the actuator 86. After step S307, the control routine ends.

In the third embodiment, the control routine of failure handling control in FIG. 5 is also executed as in the first embodiment.

Although the preferred embodiments according to the present disclosure have been described above, the present disclosure is not limited to these embodiments, and various modifications and changes can be made within the scope of the claims.

For example, the vehicle 1 may be used only by one specific user. In this case, matching between the user and the vehicle 1 is not performed. Also, the vehicle 1 may be owned by the user instead of the service provider providing the mobility service. In this case, matching between the user and the vehicle 1 and settlement of the usage charge are not performed.

When the failure detection unit 91 detects a failure of the seatbelt of the vehicle 1, the vehicle controller 92 may urge the passenger of the vehicle 1 to use a seat having a non-failed seatbelt, via the HMI 87 or the portable terminal 3. Also, when the failure detection unit 91 detects a failure of the seatbelt of the vehicle 1, the server 2 may reduce a riding capacity of the vehicle 1 by the number of the failed seatbelt and performs matching between the user and the vehicle 1 based on the reduced riding capacity.

The embodiments described above can be implemented in any combination. When the second embodiment and the third embodiment are combined, in the third embodiment, the control routine of failure handling control of FIG. 7 is executed in addition to the control routine of the getting-off process of FIG. 8.

What is claimed is:

1. A vehicle control device that controls an autonomous traveling vehicle including doors provided on both sides of the vehicle in a traveling direction, the vehicle control device comprising:
    a failure detection unit configured to detect a failure of an on-vehicle component other than the vehicle control device of the vehicle; and
    a vehicle controller configured to:
        control the vehicle to autonomously travel based on a travel plan to reach a destination,
        determine whether the vehicle is unreachable to the destination by autonomous traveling based on a type of the on-vehicle component for which the failure detection unit detects the failure, wherein, based on the type of the on-vehicle component for which the failure detection unit detects the failure being a first type that affects the autonomous traveling of the vehicle, the vehicle controller determines that the vehicle is unreachable to the destination by the autonomous traveling, and wherein, based on the type of the on-vehicle component for which the failure detection unit detects the failure being a second type that does not affect the autonomous traveling of the vehicle, the vehicle controller determines that the vehicle is reachable to the destination by the autonomous traveling,
        change the control of the vehicle depending on a result of the determination,
        acquire an estimated getting-off position,
        determine, when the failure detection unit detects a failure in a door on one side of the vehicle, whether a passenger can get off from another door on another side of the vehicle at the estimated getting-off position,
        cause the vehicle to stop at the estimated getting-off position, when the vehicle controller determines that the passenger can get off from the another door on the another side at the estimated getting-off position, and
        change the estimated getting-off position, when the vehicle controller determines that the passenger cannot get off from the another door on the another side at the estimated getting-off position.

2. The vehicle control device according to claim 1, further comprising a failure notification unit configured to perform a notification of the failure of the on-vehicle component,
    wherein the failure notification unit transmits failure information to a server outside the vehicle when the failure detection unit detects the failure of the on-vehicle component.

3. The vehicle control device according to claim 1, further comprising a failure notification unit configured to perform a notification of the failure of the on-vehicle component,
    wherein the failure notification unit notifies the passenger of the vehicle of failure information when the failure detection unit detects the failure of the on-vehicle component.

4. The vehicle control device according to claim 1, wherein the vehicle controller determines whether the vehicle is movable, and issues a warning to an outside of the vehicle when the failure detection unit detects the failure of the on-vehicle component and the vehicle is immovable.

5. The vehicle control device according to claim 1, wherein the vehicle controller causes the vehicle to stop at a stoppable position when the failure detection unit detects the failure of the on-vehicle component and the vehicle is movable and the vehicle is unreachable to the destination by the autonomous traveling.

6. The vehicle control device according to claim 1, wherein the vehicle controller causes the vehicle to move to the destination, and then causes the vehicle to move to a maintenance facility when the failure detection unit detects the failure of the on-vehicle component and the vehicle is reachable to the destination by the autonomous traveling.

7. A passenger transportation system comprising:
    a server configured to create a traveling plan based on a vehicle allocation request from a user;
    a vehicle configured to autonomously travel based on the traveling plan;
    a failure detection unit configured to detect a failure of an on-vehicle component on the vehicle including at least doors provided on both sides of the vehicle in a traveling direction; and
    a vehicle controller configured to:
        control the vehicle to autonomously travel based on the traveling plan to reach a destination,
        determine whether the vehicle is unreachable to the destination by autonomous traveling based on a type of the on-vehicle component for which the failure detection unit detects the failure, wherein, based on the type of the on-vehicle component for which the failure detection unit detects the failure being a first type that affects the autonomous traveling of the vehicle, the vehicle controller determines that the vehicle is unreachable to the destination by the autonomous traveling, and wherein, based on the type of the on-vehicle component for which the failure detection unit detects the failure being a second type that does not affect the autonomous traveling of the vehicle, the vehicle controller determines that the vehicle is reachable to the destination by the autonomous traveling,
        change the control of the vehicle depending on a result of the determination,
        acquire an estimated getting-off position,
        determine, when the failure detection unit detects a failure in a door on one side of the vehicle, whether a passenger can get off from another door on another side of the vehicle at the estimated getting-off position,
        cause the vehicle to stop at the estimated getting-off position, when the vehicle controller determines that the passenger can get off from the another door on the another side at the estimated getting-off position, and
        change the estimated getting-off position, when the vehicle controller determines that the passenger cannot get off from the another door on the another side at the estimated getting-off position.

8. The vehicle control device according to claim 1, wherein when the detection of the failure of the on-vehicle component is a failure of a seatbelt of the vehicle, the vehicle controller suggests to the passenger, via a human interface unit (HMI), to use a seat having a non-failed seatbelt.

9. The passenger transportation system according to claim 7, wherein when the detection of the failure of the on-vehicle component is a failure of a seatbelt of the vehicle, the vehicle controller suggests to the user, via a human interface unit (HMI), to use a seat having a non-failed seatbelt.

10. A vehicle control device that controls an autonomous traveling vehicle that has on-vehicle components other than the vehicle control device, the on-vehicle components including (i) a first group of on-vehicle components that, upon detection of a failure thereof, cause the vehicle to be unable to reach a destination by autonomous traveling, and (ii) a second group of on-vehicle components that, upon detection of a failure thereof, do not cause the vehicle to be unable to reach the destination by the autonomous traveling, the vehicle control device comprising:

at least one processor programmed to:
control the autonomous traveling vehicle to autonomously travel based on a travel plan to reach the destination,
determine whether a failure detection unit detects a failure of one of the on-vehicle components;
based upon the determination that the failure of the one of the on-vehicle components has been detected, determine whether the one of the on-vehicle components is in the first group of on-vehicle components or in the second group of on-vehicle components, wherein, based on the one of the on-vehicle components being in the first group of on-vehicle components, the at least one processor determines that the vehicle is unreachable to the destination by the autonomous traveling, and wherein, based on the one of the on-vehicle components being in the second group of on-vehicle components, the at least one processor determines that the vehicle is reachable to the destination by the autonomous traveling;
cause the vehicle to stop at a stoppable position when the one of the on-vehicle components is in the first group of on-vehicle components; and
cause the vehicle to move to the destination and then to move to a maintenance facility when the one of the on-vehicle components is in the second group of on-vehicle components,
wherein
the second group of on-vehicle components includes doors provided on both sides of the vehicle in a traveling direction, and
the at least one processor is programmed to:
acquire an estimated getting-off position,
determine, when the failure detection unit detects a failure in a door on one side of the vehicle, whether a passenger can get off from another door on another side of the vehicle at the estimated getting-off position,
cause the vehicle to stop at the estimated getting-off position, when the at least one processor determines that the passenger can get off from the another door on the another side at the estimated getting-off position, and
change the estimated getting-off position, when the at least one processor determines that the passenger cannot get off from the another door on the another side at the estimated getting-off position.

* * * * *